No. 705,973. Patented July 29, 1902.
W. A. SUTTLE.
COUPLING FOR CONNECTING HANDLES TO TOOLS.
(Application filed Apr. 17, 1902.)
(No Model.)
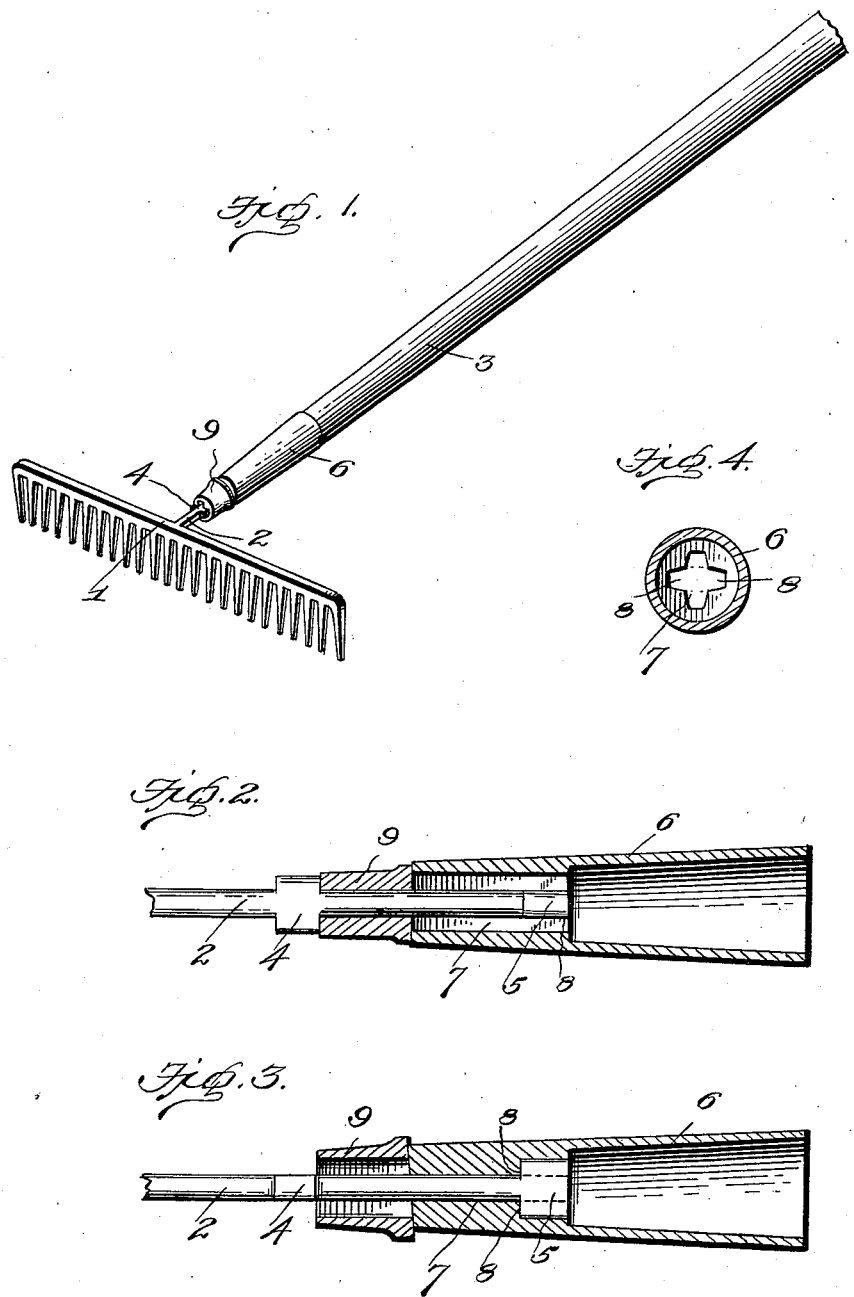
Witnesses
Inventor
W. A. Suttle
By H. B. Wilson & Co.
Attorneys

United States Patent Office.

WILLIS A. SUTTLE, OF AUSTIN, TEXAS.

COUPLING FOR CONNECTING HANDLES TO TOOLS.

SPECIFICATION forming part of Letters Patent No. 705,973, dated July 29, 1902.

Application filed April 17, 1902. Serial No. 103,449. (No model.)

*To all whom it may concern:*

Be it known that I, WILLIS A. SUTTLE, a citizen of the United States, residing at Austin, in the county of Travis and State of Texas, have invented certain new and useful Improvements in Couplings for Connecting Handles to Tools; and I do declare the following to be a full, clear, and exact description of the invention, such as will enable others skilled in the art to which it appertains to make and use the same.

The invention relates to a coupling for connecting handles to tools and agricultural implements of the rake or hoe type or, in fact, any other implement which is provided with a tang.

The object of the invention is to provide a coupling of this character which shall be simple of construction, durable in use, comparatively inexpensive of production, and by means of which the tool may be easily and quickly connected to and detached from its handle.

With this and other objects in view the invention consists of certain novel features of construction, combination, and arrangement of parts, which will be hereinafter more fully described and particularly pointed out in the appended claim.

In the accompanying drawings, Figure 1 is a perspective view illustrating my invention applied. Fig. 2 is a longitudinal sectional view taken through the sleeve, cuff, and tang. Fig. 3 is a similar view at right angles to Fig. 2, and Fig. 4 is a cross-sectional view through the sleeve at that point where the slots intersect the aperture.

In the accompanying drawings, in which I have illustrated the invention applied to a rake and its handle, 1 denotes the head of the rake, 2 the tang, and 3 the handle. The tang 2 is provided with transversely-extending shoulders 4 and 5, one arranged above the other and preferably projecting in a plane at right angles to each other.

6 denotes a sleeve, which is secured to the lower end of the handle in any suitable manner and is provided with an aperture 7, which corresponds in outline to the shoulder 5. This aperture has its walls provided with diametrically opposite slots 8, which are shaped to receive the shoulder 5 after it has been inserted upwardly through the aperture 7 and given a quarter of a turn and pulled downwardly.

9 denotes a cuff, which has an aperture to receive the shoulder 4 and has its upper end preferably beveled, for a purpose hereinafter described.

In assembling the parts the cuff is first slipped over the tang toward its lower end. The upper end of the tang is now inserted in the sleeve 6 and the shoulder 5 slid upwardly until it reaches the enlarged bore of the sleeve and is then given a quarter turn or twist and pulled downwardly. This brings the shoulder 5 into the slot 8 and prevents rotation of the tang. The cuff is now slipped upwardly above the shoulder 4 and into engagement with the lower end of the sleeve and is given a slight turn, which unalines its aperture with the shoulder 4 and at the same time, due to the beveled end of the cuff, causes it to draw downwardly upon the tang, and thus securely lock its shoulder in the slot 7. This beveling also tends to increase the frictional engagement of the cuff with the sleeve and prevent its accidental rotation.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

In a device of the character described, the combination with a sleeve having communicating vertical and horizontal slots disposed one above the other, of a tang having transversely-projecting shoulders one arranged above the other, and a cuff having a tapering end to coact with the lower end of the sleeve and the lowermost shoulder to hold the uppermost shoulder in the horizontal slot, substantially as set forth.

In testimony whereof I have hereunto set my hand in presence of two subscribing witnesses.

WILLIS A. SUTTLE.

Witnesses:
JAMES MERDIEF,
THERESA E. QUAST.